(12) United States Patent
Pauley, Jr. et al.

(10) Patent No.: US 9,407,663 B1
(45) Date of Patent: Aug. 2, 2016

(54) METHOD AND APPARATUS FOR MAN-IN-THE-MIDDLE AGENT-ASSISTED CLIENT FILTERING

(75) Inventors: Wayne A. Pauley, Jr., Hudson, NH (US); Stephen J. Todd, Shrewsbury, MA (US); Michel F. Fisher, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 114 days.

(21) Appl. No.: 13/536,337

(22) Filed: Jun. 28, 2012

Related U.S. Application Data

(63) Continuation-in-part of application No. 13/247,423, filed on Sep. 28, 2011, now abandoned.

(51) Int. Cl.
*H04L 29/06* (2006.01)

(52) U.S. Cl.
CPC ...................... *H04L 63/20* (2013.01)

(58) Field of Classification Search
CPC ....................................................... H04L 63/20
USPC ........................................................ 726/22, 23
See application file for complete search history.

(56) References Cited

U.S. PATENT DOCUMENTS

| | | | | |
|---|---|---|---|---|
| 6,976,089 B2* | 12/2005 | Na | .................. | H04L 63/0263 709/223 |
| 7,448,067 B2* | 11/2008 | Yadav | .................. | H04L 63/0227 709/223 |
| 7,577,132 B2* | 8/2009 | Katz | .................. | H04L 61/1523 370/352 |
| 7,716,240 B2* | 5/2010 | Lim | .................. | G06F 21/6227 707/781 |
| 7,761,912 B2* | 7/2010 | Yee | .................. | H04L 63/0263 726/11 |
| 7,827,607 B2* | 11/2010 | Sobel | .................. | H04L 63/105 726/22 |
| 7,913,303 B1* | 3/2011 | Rouland | .................. | H04L 63/0227 726/22 |
| 8,381,297 B2* | 2/2013 | Touboul | .................. | G06F 21/562 713/164 |
| 8,402,543 B1* | 3/2013 | Ranjan | .................. | H04L 63/1416 709/223 |
| 8,973,088 B1* | 3/2015 | Leung | .................. | H04L 63/00 726/1 |
| 2004/0111643 A1* | 6/2004 | Farmer | .................. | G06F 21/604 726/1 |
| 2008/0104661 A1* | 5/2008 | Levin | .................. | G06F 21/6218 726/1 |
| 2010/0011200 A1* | 1/2010 | Rosenan | .................. | G06F 21/575 713/2 |

(Continued)

OTHER PUBLICATIONS

Dixon, Colin, Arvind Krishnamurthy, and Thomas E. Anderson. "An End to the Middle." HotOS. vol. 9. 2009.*

*Primary Examiner* — James Turchen
(74) *Attorney, Agent, or Firm* — Krishnendu Gupta; Gerald P. Kazanjian

(57) ABSTRACT

Example embodiments of the present invention relate to a method, an apparatus and a computer-program product for man-in-the-middle agent-assisted client filtering. An example method to be performed by the man-in-the-middle includes receiving portions of a data stream transmitted from a source and performing an analysis of the portions of the data stream. Based on the analysis, the man-in-the-middle then may interact with the source. An example method to be performed by an agent at the source includes providing portions of a transmitted data stream to the man-in-the-middle and interacting with the man-in-the-middle.

24 Claims, 6 Drawing Sheets

(56) References Cited

U.S. PATENT DOCUMENTS

| | | | |
|---|---|---|---|
| 2010/0036779 A1* | 2/2010 | Sadeh-Koniecpol | H04L 63/20 706/11 |
| 2010/0064341 A1* | 3/2010 | Aldera | H04L 63/102 726/1 |
| 2010/0153568 A1* | 6/2010 | Uola | H04L 67/02 709/229 |
| 2010/0293610 A1* | 11/2010 | Beachem | G06F 21/552 726/15 |
| 2011/0153811 A1* | 6/2011 | Jeong | H04L 63/14 709/224 |
| 2011/0167470 A1* | 7/2011 | Walker | H04L 67/1095 726/1 |
| 2011/0209196 A1* | 8/2011 | Kennedy | G06F 21/55 726/1 |
| 2012/0023546 A1* | 1/2012 | Kartha | H04L 63/104 726/1 |
| 2012/0030750 A1* | 2/2012 | Bhargava | H04L 63/02 726/13 |

* cited by examiner

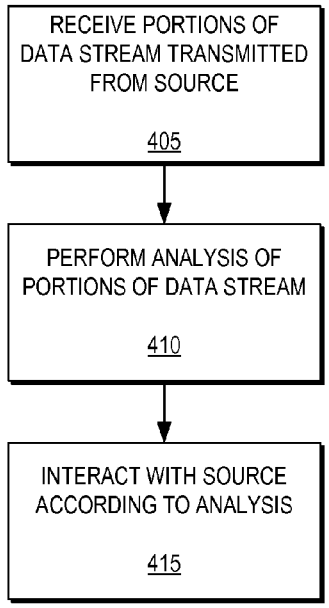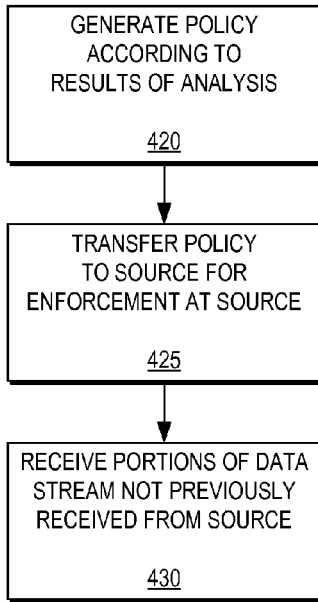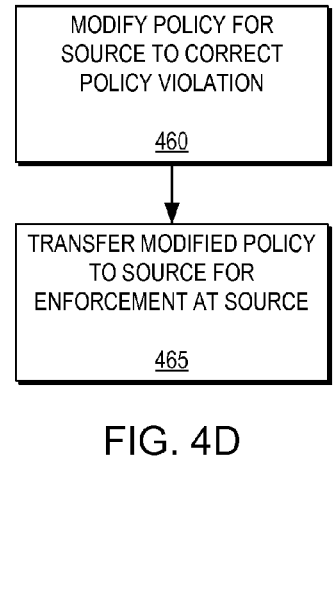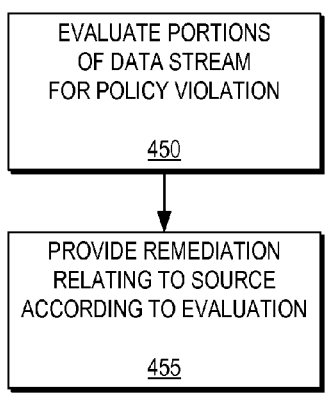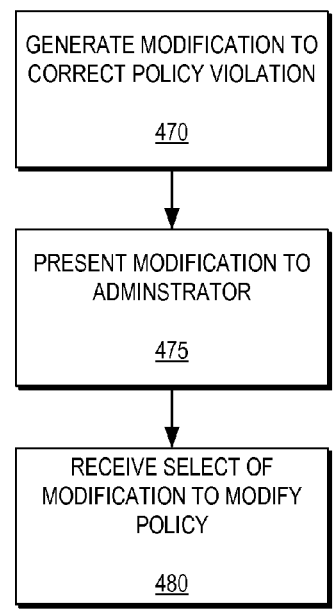

METHOD AND APPARATUS FOR MAN-IN-THE-MIDDLE AGENT-ASSISTED CLIENT FILTERING

CROSS REFERENCE TO RELATED APPLICATIONS

This application is a Continuation-in-Part of U.S. patent application Ser. No. 13/247,423 entitled "METHOD AND APPARATUS FOR FRIENDLY MAN-IN-THE-MIDDLE DATA STREAM INSPECTION" filed on Sep. 28, 2011, the contents and teachings of which are incorporated herein by reference in their entirety.

This application is related to U.S. patent application Ser. No. 13/247,549 entitled "METHOD AND APPARATUS FOR PRIVACY-RESPECTING NOTIFICATION OF SECURITY THREATS" and Ser. No. 13/247,623 entitled "METHOD AND APPARATUS FOR ENCRYPTION WITH VIEWER IDENTITY- AND CONTENT ADDRESS-BASED IDENTITY PROTECTION", filed on Sep. 28, 2011; Ser. No. 13/340,104 entitled "TIME-BASED ANALYSIS OF DATA STREAMS" and Ser. No. 13/340,007 entitled "DATA TRACKING FOR PROVENANCE AND CHAIN OF CUSTODY GENERATION", filed on Dec. 29, 2011; Ser. No. 13/436,702 entitled "METHOD AND APPARATUS FOR COOKIE ANONYMIZATION AND REJECTION" filed on Mar. 30, 2012; and Ser. No. 13/536,504 entitled "METHOD AND APPARATUS FOR CONTENT, ENDPOINT, AND PROTOCOL MAN-IN-THE-MIDDLE USER INTERFACE" and Ser. No. 13/536,637 entitled "DIGITAL DISAPPEARING INK", filed on even date herewith, the teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information is outsiders.

SUMMARY

Example embodiments of the present invention relate to a method, an apparatus and a computer-program product for man-in-the-middle agent-assisted client filtering. An example method to be performed by the man-in-the-middle includes receiving portions of a data stream transmitted from a source and performing an analysis of the portions of the data stream. Based on the analysis, the man-in-the-middle then may interact with the source. An example method to be performed by an agent at the source includes providing portions of a transmitted data stream to the man-in-the-middle and interacting with the man-in-the-middle.

BRIEF DESCRIPTION OF THE DRAWINGS

The above and further advantages of the present invention may be better under stood by referring to the following description taken into conjunction with the accompanying drawings in which:

FIGS. 4A-4E are flow diagrams illustrating methods for operation on a man-in-the-middle according to example embodiments of the present invention;

DETAILED DESCRIPTION

Figure 1:
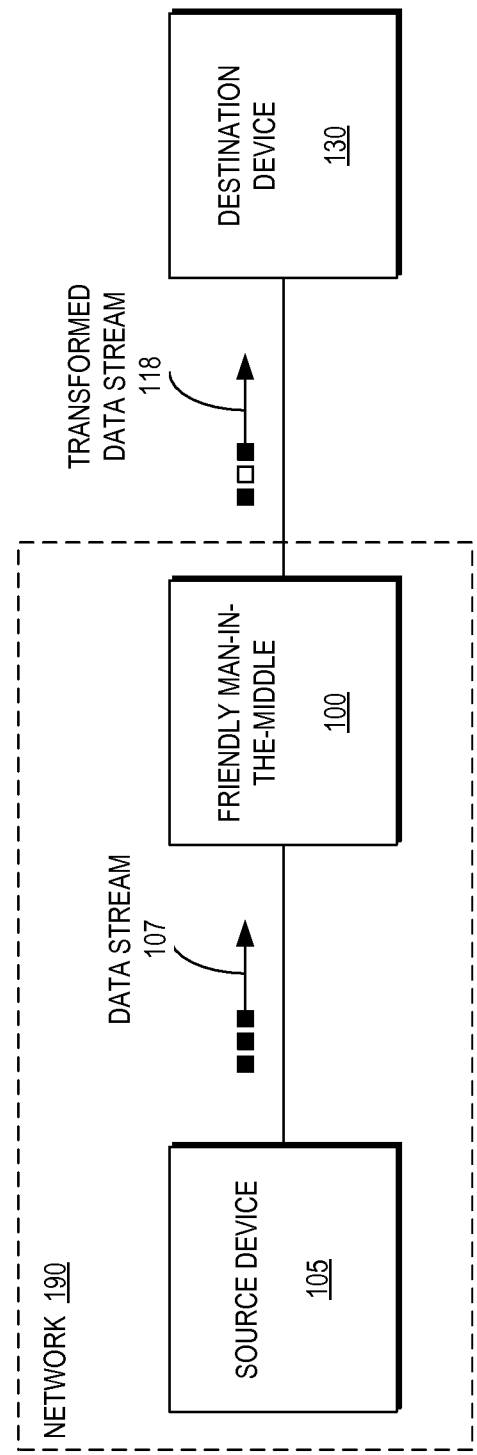
FIGS. 1 and 2 are block diagrams illustrating an example embodiment of the present invention deployed in a network environment.

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computer, televisions, audiovisual receiver, music players, radio, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Part of the content flowing over the network is cookies/beacons. Cookies provide an unknown leakage of private information from internal systems to external networks. One example of a cookie is a key-click cookie, which enables marketing for every click that a user is making and is often associated with free applications. That cookie may contain sensitive information like name, age, sex, location, account numbers, etc. Malware can hijack cookies and accelerate the leakage of information by continually uploading sensitive information at a very high rate. Web beacons leak user activity between websites out to external sources.

As understood in the art, these objects are buffers that may be filtered and examined. However, traditional packet inspectors typically only look at fingerprint, source, and destination information, but do not inspect at the content level. Therefore, content-aware drill-down analysis of cookies/beacons may enable an administrator to decipher cookie content and establish one or more policies to either block or anonymize cookies/beacons. Further, the pace and frequency of cookies can also be viewed.

Therefore, a centralized point of control is desirable that performs a lexical analysis of cookies/beacons in a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a cookie/beacon in a data stream for keywords and employ a blocking or masking mechanism to protect unauthorized or potentially harmful data from escaping the household (i.e., intentional or accidental), irrespective of source-type (i.e., agentless) and in a manner transparent to the destination.

Example embodiments of the present invention specifically targets cookies and beacons that flow through a system, and historically track cookie and beacon traffic in order to perform drill-down inspection on the contents. This inspection allows for detection of sensitive information such as credit cards, location, and any other personal info, as well as the potential presence of malware which is performing unusual behavior within the private system.

FIG. 1 is a block diagram illustrating an example embodiment of the present invention 100 in a network environment 190. As illustrated in FIG. 1, the network 190 includes a source device 105 that may transmit a data stream 107, including a cookie 108, intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 performs a lexical analysis of content (i.e., payload) of cookies 108 included in the data stream 107. The FMITM 100 then forwards the cookie 108 out of the network 190 to the intended destination device 130 as a transformed data stream 118 according to the lexical analysis. It should be noted that, in certain embodiments, the transformed data stream 118 may be a blocking of the cookie 108 or an anonymization of the cookie 108.

Figure 2:
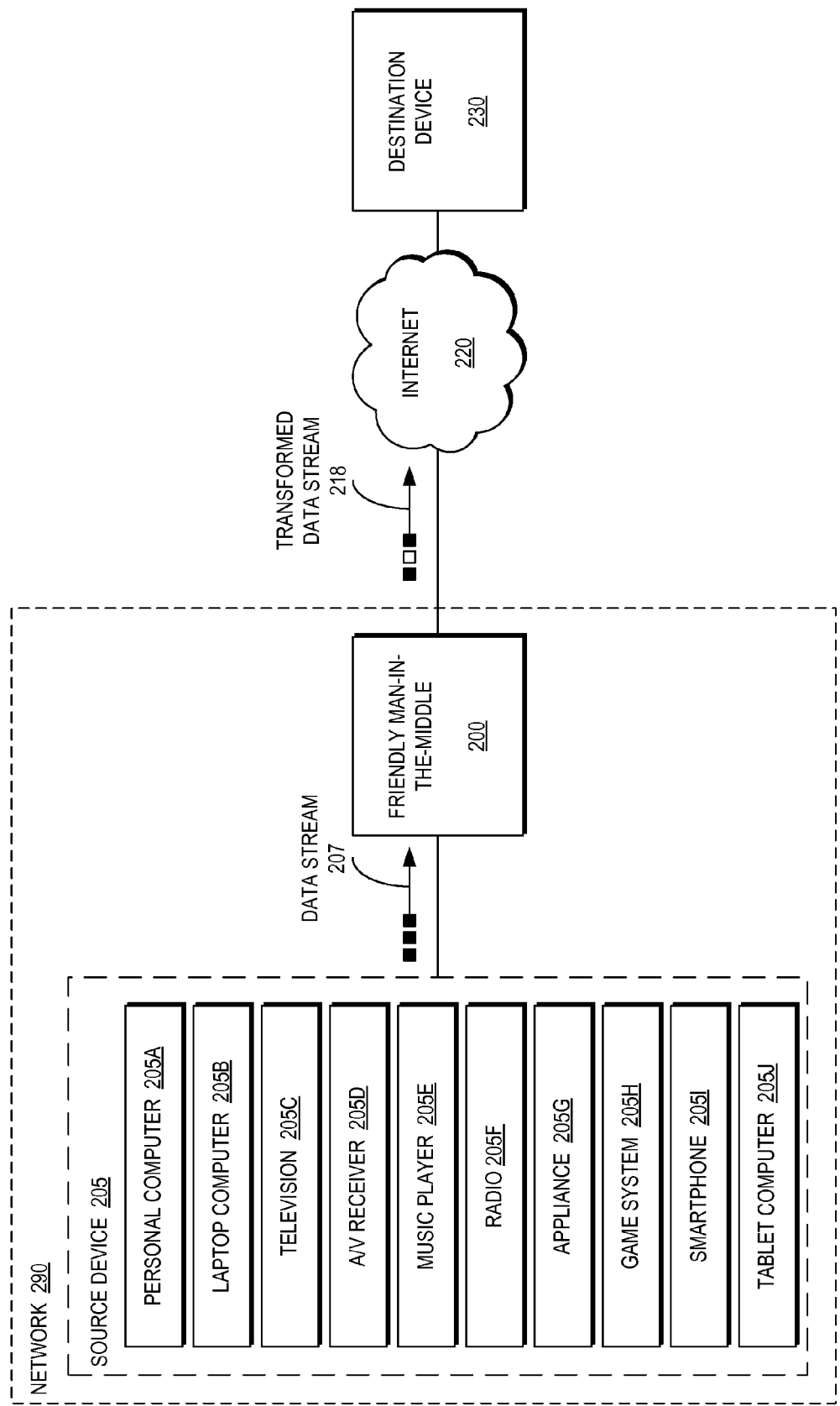

FIG. 2 is a block diagram illustrating an example embodiment of the present invention 200 in a network environment 290. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207, including a cookie 208, intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 then forwards the cookie 208 out of the network 290 to the intended destination device 230 as a transformed data stream 218 according to the lexical analysis. In other embodiments, the FMITM 200 may include hardware to act as a repeater for the cellular telephony carrier so that it may intercept wireless communications and forward them back to the cellular telephony carrier's network (e.g., 3G or 4G network).

Man-in-the-Middle Agent-Assisted Client Filtering

Certain embodiments of the FMITM rely on all users within a private network to attach to the FMITM infrastructure (e.g., certain embodiments described in U.S. patent application Ser. No. 13/247,423 entitled "METHOD AND APPARATUS FOR FRIENDLY MAN-IN-THE-MIDDLE DATA STREAM INSPECTION", Ser. No. 13/247,549 entitled "METHOD AND APPARATUS FOR PRIVACY-RESPECTING NOTIFICATION OF SECURITY THREATS", and Ser. No. 13/247,623 entitled "METHOD AND APPARATUS FOR ENCRYPTION WITH VIEWER IDENTITY-AND CONTENT ADDRESS-BASED IDENTITY PROTECTION", filed on Sep. 28, 2011, and Ser. No. 13/436,702 entitled "METHOD AND APPARATUS FOR COOKIE ANONYMIZATION AND REJECTION", filed on Mar. 30, 2012, the teachings of which are hereby incorporated by reference in their entirety).

However, the proliferation of mobile devices allow a user to leave the private (e.g., home or business) and avoid the protections provided by the FMITM infrastructure and become susceptible to data privacy leakage. For example, a user of a cell phone uploads a picture revealing location information because the phone is not connected to the user's home FMITM infrastructure. Likewise, a user of mobile device begins violating after-hours communication policies because the device is not connected to the home FMITM infrastructure.

Example embodiments of the present invention address these and other problems by embedding FMITM functionality into an agent which runs on the source device, thereby providing a more robust and complete monitoring solution and allowing for continual enforcement on mobile devices that either are not directly tied into the private network or forcing them to connect into the private network. Further, the agent may enforce on the source device certain policies (e.g., no texts after midnight) that the FMITM would normally enforce.

Mobile devices that connect into a FMITM infrastructure may have a signature endpoint and user ID associated with them. The FMITM may build a profile for that source device which is a subset of all users connecting into the FMITM infrastructure. The FMITM may push this endpoint-specific profile to an agent running on the source device whenever the profile is updated, which enforces the privacy constraints after the source device disconnects from the MITM infrastructure. The source device also may log content-aware chatter that is not restricted and may upload those logs on connection to the FMITM infrastructure so that the FMITM may know what activities occurred involving the source device during times the source device was disconnected from the FMITM infrastructure and restrict future policy violations involving the source device similar to those that may have happened at times the source device was disconnected from the FMITM infrastructure.

Accordingly, example embodiments of the present invention increase policy management and filtering at endpoint by allowing the FMITM to push down device-specific content/endpoint/protocol policies to a source device that connects to the FMITM (i.e., remediation). Further, the agent may upload content/endpoint/protocol communications that occurred while the source device was disconnected from the FMITM infrastructure. Moreover, the FMITM may analyze privacy violations (using, for example, a FMITM log-analyzer), modify the profile for that source device, and push the profile (i.e., policy) down to the source device to prevent future privacy violations.

Figure 3:
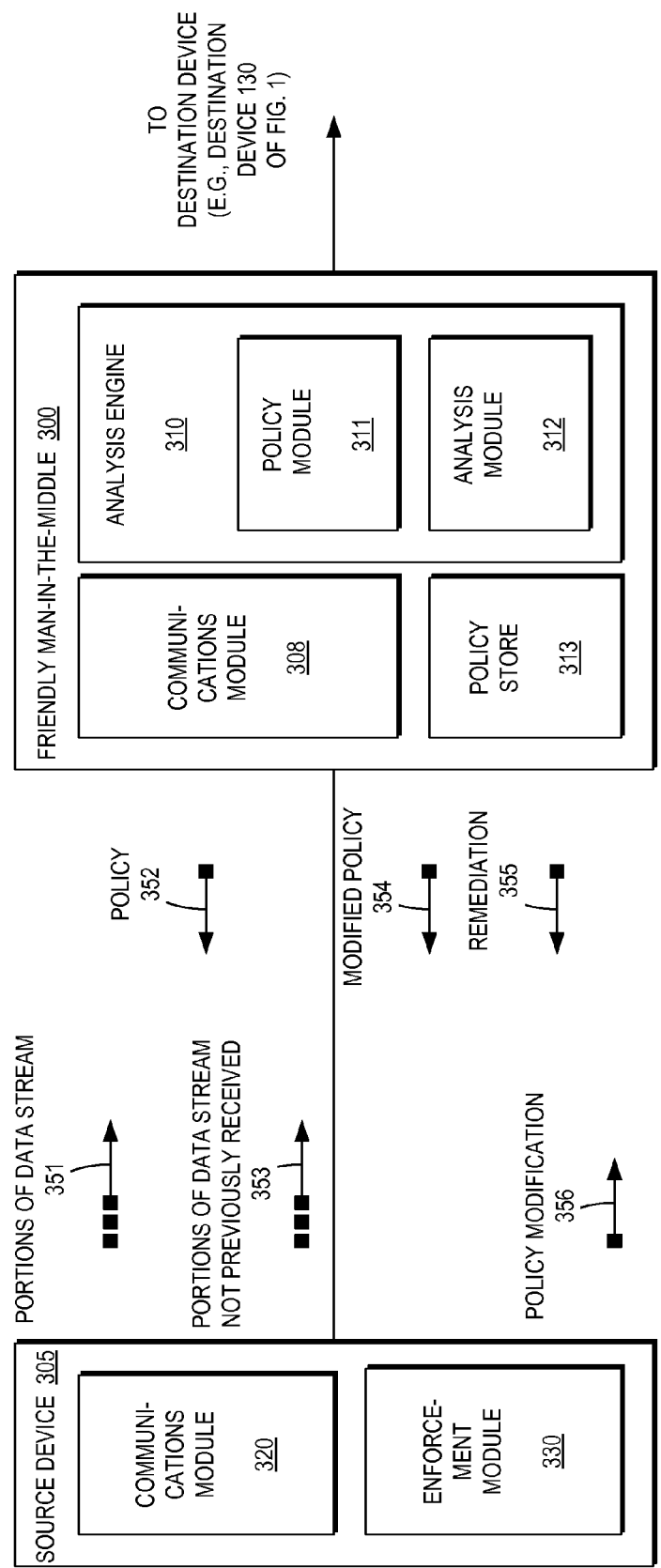
FIG. 3 is a block diagram illustrating a man-in-the-middle and a source device with an agent according to example embodiments of the present invention.

FIG. 3 is a block diagram illustrating a man-in-the-middle 300 and a source device 305 according to example embodiments of the present invention. FIGS. 4A-4E are flow diagrams illustrating methods for operation on a man-in-the-middle 300 according to example embodiments of the present invention. FIGS. 5A-5D are flow diagrams illustrating methods for operation on a source device 305 according to an example embodiment of the present invention. FIGS. 3, 4A-4E, and 5A-5D may be described in conjunction.

As illustrated in FIGS. 3 and 4A, a FMITM 300 may include a communications module 308 configured to receive portions of a data stream 351 transmitted from a source device 305 (405) and an analysis engine 310 configured to perform an analysis of the portions of the data stream 351 (410). The communications module 308 also may interact with the source device 305 according to the analysis of the portions of the data stream 351 (415).

As illustrated in FIGS. 3 and 4B, in certain embodiments, the analysis engine 310 may include a policy module 311 configured to generate a policy according to the results of the analysis (420). The communications module 308 then may transfer the policy 352 to the source device 305 for enforcement at the source device 305 (425). At other times, the communications module 308 may receive portions of the data stream not previously received 353 from the source device 305 (430). An analysis module 312 of the analysis engine 310 then may perform an analysis of the portions of the data stream not previously received 353 from the source device 305 (435). Based on the analysis of the received portions of the data stream not previously received from the source device, the policy module 311 may modify the policy for the source device (440). The communications module 308 then may transfer the modified policy 354 to the source device 305 for enforcement at the source device 305 (445).

As illustrated in FIGS. 3 and 4C, in other embodiments, the analysis module 312 may evaluate the portions of the data stream (e.g., portions of the data stream 351 and portions of the data stream not previously received 353) for a policy violation (e.g., such as by evaluating the portion of the data stream against policies stored in a policy store 313) (450). The communications module 308 then may provide a remediation 355 relating to the source device 305 according to the evaluation (455).

As illustrated in FIGS. 3 and 4D, in certain embodiments, the analysis engine 310 may include a policy module 311 to modify the policy for the source device 305 to correct the policy violation (460) and the communications module 308 may transfer the modified policy 354 to the source device 305 for enforcement at the source device 305 (465).

As illustrated in FIGS. 3 and 4E, the analysis module 312 may generate a modification to correct the policy violation (470) and the communications module may present the modification to an administrator (475) and receive a selection of the modification to modify the policy (480).

Figure 5A:
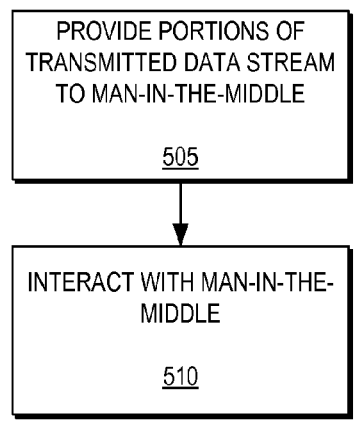
FIGS. 5A-5D are flow diagrams illustrating methods for operation on a source device with an agent according to example embodiments of the present invention.

As illustrated in FIGS. 3 and 5A, a source device 305 may include a communications module 320 configured to provide portions of a transmitted data stream 351 to a man-in-the-middle 300 (505) and an enforcement module 330 configured to interact with the man-in-the-middle (510).

Figure 5B:
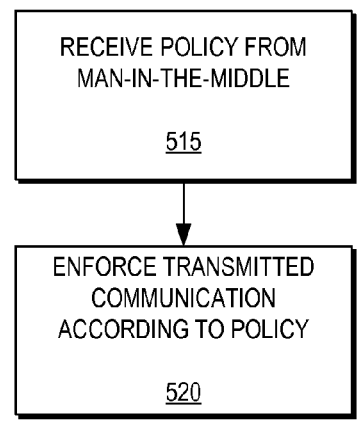

As illustrated in FIGS. 3 and 5B, the communications module 320 may receive a policy 352 from the man-in-the-middle 300 (515). The enforcement module 330 then may enforce transmitted communications according to the policy 352 (520).

Figure 5C:
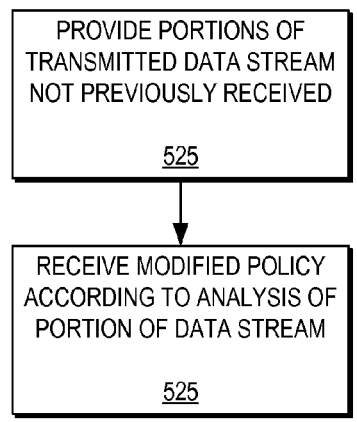

As illustrated in FIGS. 3 and 5C, the communications module 320 may provide portions of the transmitted data stream not previously received 353 by the man-in-the middle 300 (525) and receive a modified policy 354 according to an analysis of the portions of the transmitted data stream not previously received 353 by the man-in-the middle 300 (530).

Figure 5D:
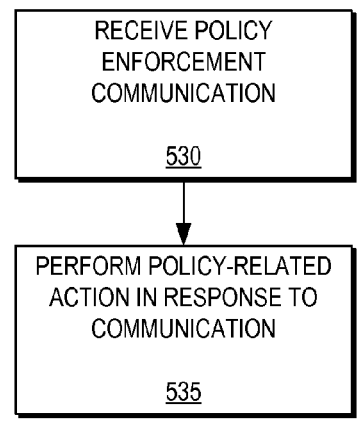

As illustrated in FIGS. 3 and 5D, the communications module 320 may receive a policy enforcement communication (i.e., remediation 355) from the man-in-the-middle 300 in response to an analysis of portions of the transmitted data stream 351 (535). The enforcement module 330 then may perform a policy-related action in response to the policy enforcement communication 355 (540). In certain embodiments, the policy enforcement notification 355 may be received by the communications module 320 at a first source device 305 regarding the analysis of portions of a transmitted data stream from a second source device (not shown) (545). The communications module 320 of the first source device 305 then may transmit a policy modification 356 to the man-in-the-middle 300 regarding the policy for the second source device (not shown) (550).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 6:
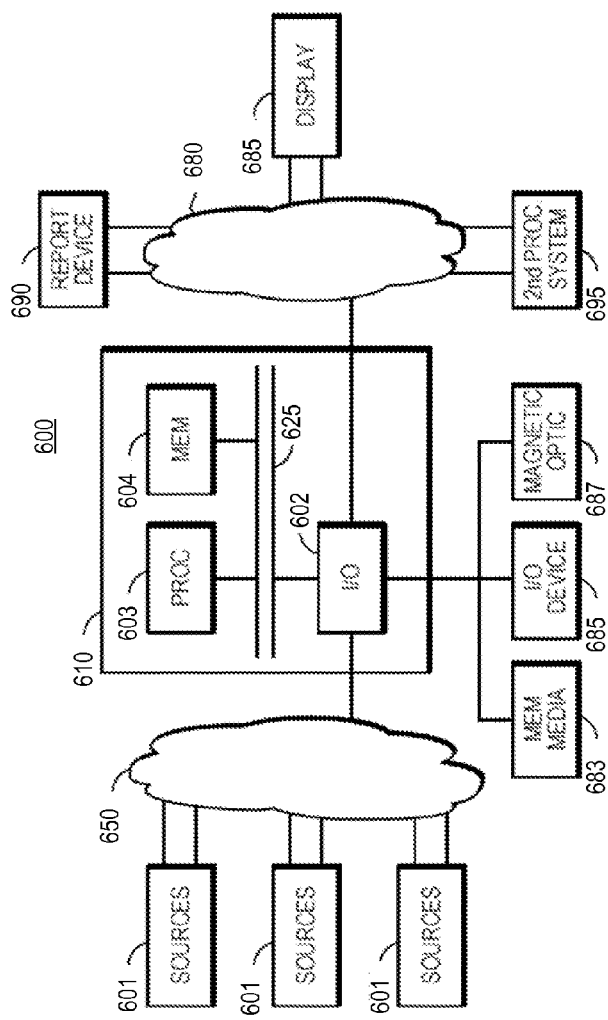
FIG. 6 is a block diagram of an example embodiment apparatus according to the present invention.

FIG. 6 is a block diagram illustrating an apparatus, such as a computer 610 in a network 600, that may utilize the techniques described herein according to an example embodiment of the present invention. The computer 610 may include one or more I/O ports 602, a processor 603, and memory 604, all of which may be connected by an interconnect 625, such as a bus. The I/O port 602 may provide connectivity to memory media 683, I/O devices 685, and drives 687, such as magnetic or optical drives. When the program code is loaded into memory 604 and executed by the computer 610, the machine becomes an apparatus for practicing the invention. When implemented on one or more general-purpose processors 603, the program code combines with such a processor to provide a unique apparatus that operates analogously to specific logic circuits. As such, a general purpose digital machine can be transformed into a special purpose digital machine.

Figure 7:
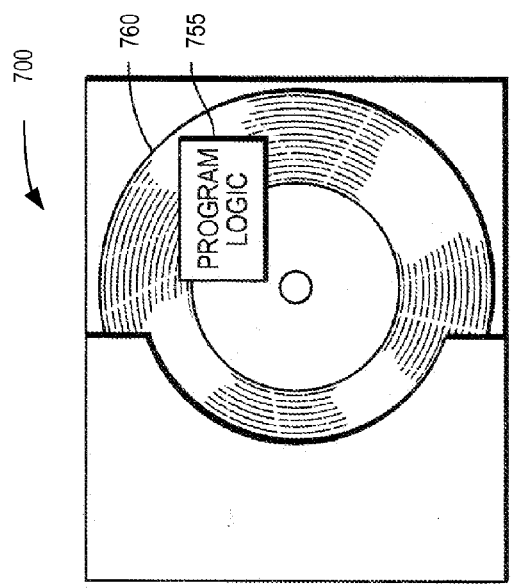
FIG. 7 is an illustration of an example embodiment of the present invention as embodied in program code.

FIG. 7 is a block diagram illustrating a method embodied on a computer readable storage medium 760 that may utilize the techniques described herein according to an example embodiment of the present invention. FIG. 7 shows Program Logic 755 embodied on a computer-readable medium 760 as shown, and wherein the Logic is encoded in computer-executable code configured for carrying out the methods of this invention and thereby forming a Computer Program Product 700.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method for data stream transmission policy enforcement by a man-in-the-middle apparatus, the method comprising:
   receiving, at the man-in-the-middle apparatus, portions of a data stream transmitted from a source device in a network intended for a destination and intercepted by the man-in-the middle apparatus at times the source device is communicatively coupled with the man-in-the-middle apparatus before the data stream escapes the network toward the destination;
   providing centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the man-in-the-middle apparatus;
   performing an analysis of the portions of the data stream transmitted from the source device and intercepted by the man-in-the middle apparatus at times the source device is communicatively coupled with the man-in-the-middle apparatus at the man-in-the-middle apparatus;
   generating a data stream transmission policy at the man-in-the middle apparatus, according to the analysis of the portions of the data stream transmitted from the source device and intercepted by the man-in-the middle apparatus at times the source device is communicatively coupled with the man-in-the-middle apparatus, for local data stream transmission policy enforcement at the source device of data stream transmissions from the source device by a man-in-the-middle agent operating on the source device at times the source device is not communicatively coupled with the man-in-the-middle apparatus;
   transferring the policy for local data stream transmission policy enforcement from the man-in-the-middle apparatus to the source device for local data stream transmission policy enforcement at the source device of data stream transmissions from the source device by the man-in-the-middle agent operating on the source device at times the source device is not communicatively coupled with the man-in-the-middle apparatus; and
   affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle apparatus and the man-in-the-middle apparatus were providing centralized data stream transmission policy enforcement of data stream transmissions from the source device.

2. The method of claim 1 further comprising:
   receiving portions of the data stream not previously received from the source device;
   performing an analysis of portions of the data stream not previously received from the source device;
   modifying the policy for the source device according to the analysis of the received portions of the data stream not previously received from the source device; and
   transferring the modified policy to the source device for enforcement at the source device at times the source device is not communicatively coupled with the man-in-the-middle apparatus.

3. The method of claim 1 further comprising:
   evaluating the portions of the data stream for a policy violation; and
   providing a remediation relating to the source device according to the evaluation.

4. The method of claim 3 wherein providing a remediation relating to the source device according to the evaluation comprises:
   modifying the policy for the source device to correct the policy violation; and
   transferring the modified policy to the source device for enforcement at the source.

5. The method of claim 4 wherein modifying the policy for the source device to correct the policy violation comprises:
   generating a modification to correct the policy violation;
   presenting the modification to an administrator; and
   receiving a selection of the modification to modify the policy.

6. A computer-implemented method for data stream transmission policy enforcement by a man-in-the-middle apparatus, the method comprising:
   providing portions of a transmitted data stream from a source device in a network intended for a destination and intercepted by the man-in-the middle apparatus at times the source device is communicatively coupled with the man-in-the-middle apparatus before the data stream escapes the network toward the destination, the man-in-the-middle apparatus configured to provide centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the man-in-the-middle apparatus;

receiving at the source device a data stream transmission policy generated at the man-in-the-middle apparatus according to an analysis performed at the man-in-the-middle apparatus of the portions of the data stream transmitted from the source device and intercepted by the man-in-the middle apparatus at times the source device is communicatively coupled with the man-in-the-middle apparatus and transferred from the man-in-the-middle apparatus to the source device for local data stream transmission policy enforcement at the source device by a man-in-the-middle agent operating on the source device at times the source device is not communicatively coupled with the man-in-the-middle apparatus; and enforcing the data stream transmission policy at the source device at times the source device is not communicatively coupled with the man-in-the-middle apparatus by the man-in-the-middle agent operating on the source device at times the source device is not communicatively coupled with the man-in-the-middle apparatus, thereby affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle apparatus and the man-in-the-middle apparatus were providing centralized data stream transmission policy enforcement of data stream transmissions from the source device.

7. The method of claim 6 further comprising:

providing portions of the transmitted data stream from the source device not previously received by the man-in-the-middle apparatus; and receiving a modified policy according to an analysis of the portions of the transmitted data stream not previously received by the man-in-the-middle apparatus for enforcement at the source device at times the source device is not communicatively coupled with the man-in-the-middle apparatus.

8. The method of claim 6 further comprising:

receiving a policy enforcement communication from the man-in-the-middle apparatus in response to an analysis of portions of the transmitted data stream; and performing a policy-related action in response to the policy enforcement communication at times the source device is not communicatively coupled with the man-in-the-middle apparatus.

9. The method of claim 8 wherein receiving a policy enforcement communication from the man-in-the-middle apparatus in response to an analysis of portions of a transmitted data stream comprises receiving a policy enforcement notification from the man-in-the-middle apparatus at a first source device regarding the analysis of portions of a transmitted data stream from a second source device; and wherein performing a policy-related action in response to the policy enforcement communication at times the source device is not communicatively coupled with the man-in-the-middle apparatus comprises transmitting a policy modification to the man-in-the middle apparatus regarding the policy for the second source device.

10. An man-in-the-middle apparatus for data stream transmission policy enforcement comprising:

a processor; and memory storing computer executable instructions that when executed on the processor cause the man-in-the-middle apparatus to perform the operations of:

receiving, at the man-in-the-middle apparatus, portions of a data stream transmitted from a source device in a network intended for a destination and intercepted by the man-in-the middle apparatus at times the source device is communicatively coupled with the man-in-the-middle apparatus before the data stream escapes the network toward the destination;

providing centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the man-in-the-middle apparatus;

performing an analysis of the portions of the data stream transmitted from the source device and intercepted by the man-in-the middle apparatus at times the source device is communicatively coupled with the man-in-the-middle apparatus at the man-in-the-middle apparatus;

generating a data stream transmission policy at the man-in-the middle apparatus according to the analysis of the portions of the data stream transmitted from the source device and intercepted by the man-in-the middle apparatus at times the source device is communicatively coupled with the man-in-the-middle apparatus, for local data stream transmission policy enforcement at the source device of data stream transmissions from the source device by a man-in-the-middle agent operating on the source device at times the source device is not communicatively coupled with the man-in-the-middle apparatus;

transferring the policy for local data stream transmission policy enforcement from the man-in-the-middle apparatus to the source device for local data stream transmission policy enforcement at the source device of data stream transmissions from the source device by the man-in-the-middle agent operating on the source device at times the source device is not communicatively coupled with the man-in-the-middle apparatus; and affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle apparatus and the man-in-the-middle apparatus were providing centralized data stream transmission policy enforcement of data stream transmissions from the source device.

11. The apparatus of claim 10 further comprising:

receiving portions of the data stream not previously received from the source device;

performing an analysis of portions of the data stream not previously received from the source device;

modifying the policy for the source device according to the received portions of the data stream not previously received from the source device; and transferring the modified policy to the source device for enforcement at the source device at times the source device is not communicatively coupled with the man-in-the-middle apparatus.

12. The apparatus of claim 10 further comprising:
evaluating the portions of the data stream for a policy violation; and
providing a remediation relating to the source device according to the evaluation.

13. The apparatus of claim 12 wherein providing a remediation relating to the source device according to the evaluation comprises:
modifying the policy for the source device to correct the policy violation; and
transferring the modified policy to the source device for enforcement at the source device.

14. The apparatus of claim 13 wherein modifying the policy for the source device to correct the policy violation comprises:
generating a modification to correct the policy violation;
presenting the modification to an administrator; and
receiving a selection of the modification to modify the policy.

15. A source device for operation of a man-in-the-middle agent operation for man-in-the-middle data stream transmission policy enforcement comprising:
a processor; and
memory storing computer executable instructions that when executed on the processor cause the man-in-the-middle apparatus to perform the operations of:
providing portions of a transmitted data stream from a source device in a network intended for a destination and intercepted by the man-in-the middle apparatus at times the source device is communicatively coupled with the man-in-the-middle apparatus before the data stream escapes the network toward the destination, the man-in-the-middle apparatus configured to provide centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the man-in-the-middle apparatus;
receiving at the source device a data stream transmission policy generated at the man-in-the-middle apparatus according to an analysis performed at the man-in-the-middle apparatus of the portions of the data stream transmitted from the source device and intercepted by the man-in-the middle apparatus at times the source device is communicatively coupled with the man-in-the-middle apparatus and transferred from the man-in-the-middle apparatus to the source device for local data stream transmission policy enforcement at the source device by a man-in-the-middle agent operating on the source device at times the source device is not communicatively coupled with the man-in-the-middle apparatus; and
enforcing the data stream transmission policy at the source device at times the source device is not communicatively coupled with the man-in-the-middle apparatus by the man-in-the-middle agent operating on the source device at times the source device is not communicatively coupled with the man-in-the-middle apparatus, thereby affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle and the man-in-the-middle apparatus were providing centralized data stream transmission policy enforcement of data stream transmissions from the source device.

16. The apparatus of claim 15 further comprising:
providing portions of the transmitted data stream from the source device not previously received by the man-in-the-middle apparatus; and
receiving a modified policy according to an analysis of the portions of the transmitted data stream not previously received by the man-in-the-middle apparatus for enforcement at the source device at times the source device is not communicatively coupled with the man-in-the-middle apparatus.

17. The apparatus of claim 15 further comprising:
receiving a policy enforcement communication from the man-in-the-middle apparatus in response to an analysis of portions of the transmitted data stream; and
performing a policy-related action in response to the policy enforcement communication at times the source device is not communicatively coupled with the man-in-the-middle apparatus.

18. The apparatus of claim 17
wherein receiving a policy enforcement communication from the man-in-the-middle apparatus in response to an analysis of portions of a transmitted data stream comprises receiving a policy enforcement notification from the man-in-the-middle apparatus at a first source device regarding the analysis of portions of a transmitted data stream from a second source device; and
wherein performing a policy-related action in response to the policy enforcement communication at times the source device is not communicatively coupled with the man-in-the-middle apparatus comprises transmitting a policy modification to the man-in-the middle apparatus regarding the policy for the second source device.

19. A computer program product having a non-transitory computer readable storage medium with instructions encoded thereon that, when executed by a processor of a computer, causes the computer to perform man-in-the-middle data stream transmission policy enforcement comprising:
computer program code for receiving portions of a data stream transmitted from a source device in a network intended for a destination and intercepted by the man-in-the middle apparatus at times the source device is communicatively coupled with the man-in-the-middle apparatus before the data stream escapes the network toward the destination;
computer program code for providing centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the computer;
computer program code for performing an analysis of the portions of the data stream transmitted from the source device and intercepted by the man-in-the middle apparatus at times the source device is communicatively coupled with the man-in-the-middle apparatus;

computer program code for generating a data stream transmission policy at the man-in-the middle apparatus according to the analysis of the portions of the data stream transmitted from the source device and intercepted by the man-in-the middle apparatus at times the source device is communicatively coupled with the man-in-the-middle apparatus, for local data stream transmission policy enforcement at the source device of data stream transmissions from the source device by a man-in-the-middle agent operating on the source device at times the source device is not communicatively coupled with the man-in-the-middle apparatus;

computer program code for transferring the policy for local data stream transmission policy enforcement from the man-in-the-middle apparatus to the source device for local data stream transmission policy enforcement at the source device of data stream transmissions from the source device by the man-in-the-middle agent operating on the source device at times the source device is not communicatively coupled with the man-in-the-middle apparatus; and computer program code for affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle apparatus and the man-in-the-middle apparatus were providing centralized data stream transmission policy enforcement of data stream transmissions from the source device.

20. The computer program product of claim 19 further comprising:
   computer program code for evaluating the portions of the data stream for a policy violation; and
   computer program code for providing a remediation relating to the source device according to the evaluation.

21. The computer program product of claim 20 wherein computer program code for providing a remediation relating to the source device according to the evaluation comprises:
   computer program code for modifying the policy for the source device to correct the policy violation; and
   computer program code for transferring the modified policy to the source device for enforcement at the source.

22. The computer program product of claim 21 wherein computer program code for modifying the policy for the source device to correct the policy violation comprises:
   computer program code for presenting a modification to an administrator to correct the policy violation; and
   computer program code for receiving a selection of the modification to modify the policy.

23. A computer program product having a non-transitory computer readable storage medium with instructions encoded thereon that, when executed by a processor of a computer, causes the computer to perform man-in-the-middle data stream transmission policy enforcement comprising computer program code for providing portions of a transmitted data stream from a source device in a network intended for a destination and intercepted by the man-in-the middle apparatus at times the source device is communicatively coupled with the man-in-the-middle apparatus before the data stream escapes the network toward the destination, the man-in-the-middle apparatus configured to provide centralized data stream transmission policy enforcement of data stream transmissions from the source device, by the man-in-the-middle apparatus at times the source device is communicatively coupled with the man-in-the-middle apparatus, without configuration of the source device as a part of a local data stream transmission policy enforcement model for enforcement of data stream transmissions from the source device, at times the source device is communicatively coupled with the man-in-the-middle apparatus;

computer program code for receiving at the source device a data stream transmission policy generated at the man-in-the-middle apparatus according to an analysis performed at the man-in-the-middle apparatus of the portions of the data stream transmitted from the source device and intercepted by the man-in-the middle apparatus at times the source device is communicatively coupled with the man-in-the-middle apparatus and transferred from the man-in-the-middle apparatus to the source device for local data stream transmission policy enforcement at the source device by a man-in-the-middle agent operating on the source device at times the source device is not communicatively coupled with the man-in-the-middle apparatus; and computer program code for enforcing the data stream transmission policy at the source device at times the source device is not communicatively coupled with the man-in-the-middle apparatus by the man-in-the-middle agent operating on the source device at times the source device is not communicatively coupled with the man-in-the-middle apparatus, thereby affecting operation of the source device, at times the source device is not communicatively coupled with the man-in-the-middle apparatus, to provide local data stream transmission policy enforcement at the source device of data stream transmissions from the source device as if the source device were communicatively coupled with the man-in-the-middle apparatus and the man-in-the-middle apparatus were providing centralized data stream transmission policy enforcement of data stream transmissions from the source device.

24. The computer program product of claim 23 further comprising:
   computer program code for receiving a policy enforcement communication from the man-in-the-middle apparatus in response to an analysis of portions of the transmitted data stream; and
   computer program code for performing a policy-related action in response to the policy enforcement communication at times the source device is not communicatively coupled with the man-in-the-middle apparatus.

* * * * *